United States Patent Office 3,061,630
Patented Oct. 30, 1962

3,061,630
(2-PROPYNYL) N,N-DI(2-PROPYNYL)p-AMINO-
BENZOATE
Chester E. Pawloski, Bay City, Mich., assignor to The
Dow Chemical Company, Midland, Mich., a corporation of Delaware
No Drawing. Filed Mar. 23, 1961, Ser. No. 97,744
1 Claim. (Cl. 260—471)

The present invention is directed to (2-propynyl) N,N-di(2-propynyl)p-aminobenzoate corresponding to the formula

This product is a crystalline solid material which is somewhat soluble in many common organic solvents and of very low solubility in water. The compound has been found to be useful as a vermicide and parasiticide for the control of a number of parasitic organisms such as round worms.

The new compound may be prepared by reacting N,N-di(2-propynyl)p-aminobenzoic acid with propargyl alcohol. The reaction may be carried out in the presence of an esterification catalyst such as sulfuric acid and conveniently in a water immiscible solvent such as benzene, toluene or hexane. The amount of the reactants to be employed is not critical, some of the desired product being produced with any proportion of ingredients. Good results are obtained when employing substantially equimolecular proportions of the reagents. The reaction takes place smoothly at the temperature range of from about 80° to 160° C. with the production of the desired product and water of reaction. The employment of a small excess of the propargyl alcohol coupled with the removal of the water of reaction as formed, generally results in optimum yields.

In carrying out the reaction, the acid, propargyl alcohol and catalyst, if employed, are mixed together and the resulting mixture heated at a temperature of from about 80° to 160° C. for a period to complete the reaction. Conveniently, the reaction may be carried out in a solvent and the solvent mixture heated at the boiling temperature. During the heating, a mixture of solvent and water of reaction may be continuously distilled out of the reaction zone, condensed and the solvent recovered. Additional solvent is introduced into the reaction zone as may be necessary. Upon completion of the reaction, the desired product may be separated and purified by conventional procedures such as filtration, decantation and recrystallization.

In a representative operation, 66 grams (0.31 mole) of N,N-di(2-propynyl)p-aminobenzoic acid, 30 grams (0.31 mole) of propargyl alcohol and 5 milliliters of surfuric acid were dispersed in 300 milliliters of benzene and the resulting mixture heated for 8 hours at the boiling temperature. The heating was carried out with continuous distillation of benzene together with the water of reaction as formed, separation of the water and recycling of the benzene. During the heating period, there was collected the theoretical amount or about 5 milliliters of water. The reaction mixture was then cooled to room temperature and filtered to obtain a (2-propynyl) N,N-di(2-propynyl)p-aminobenzoate product as a crystalline solid melting at 52°–54° C.

The novel product of the present invention is useful as a parasiticide and vermicide. For such uses, the product is dispersed on an inert finely divided solid and employed as a dust. Such mixtures also may be dispersed in water with or without the aid of a surface active agent and the resulting aqueous suspensions employed as sprays. In other procedures, the product is employed as an active constituent in solvent solutions, oil-in-water or water-in-oil emulsions, or aqueous dispersions. In a representative operation (2-propynyl) N,N-di(2-propynyl)p-aminobenzoate gives 100 percent kills of round worms at a concentration of 300 parts per million by weight.

The N,N-di(2-propynyl)p-aminobenzoic acid to be employed as a starting material in accordance with the present teachings may be prepared by one mole of p-aminobenzoic acid with 2 moles of propargyl bromide in the presence of 2 moles of potassium carbonate. Upon completion of the reaction the desired starting material is separated as a crystalline solid melting at 71°–73° C.

I claim:
(2-propynyl) N,N-di(2-propynyl)p-aminobenzoate.

No references cited.